United States Patent
Wang et al.

(10) Patent No.: US 11,871,371 B2
(45) Date of Patent: Jan. 9, 2024

(54) METHOD AND APPARATUS FOR MAINTAINING UPLINK SYNCHRONIZATION AND REDUCING BATTERY POWER CONSUMPTION

(71) Applicant: InterDigital Technology Corporation, Wilmington, DE (US)

(72) Inventors: Jin Wang, Princeton, NJ (US); John S. Chen, Ann Arbor Township, MI (US); Mohammed Sammour, Alrabieh-Amman (JO); Stephen E. Terry, Northport, NY (US); Arty Chandra, Roslyn, NY (US); Guodong Zhang, Woodbury, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 17/991,220

(22) Filed: Nov. 21, 2022

(65) Prior Publication Data

US 2023/0080389 A1  Mar. 16, 2023

Related U.S. Application Data

(63) Continuation of application No. 16/935,035, filed on Jul. 21, 2020, now Pat. No. 11,711,777, which is a
(Continued)

(51) Int. Cl.
*H04W 56/00* (2009.01)
*H04W 52/02* (2009.01)
(Continued)

(52) U.S. Cl.
CPC ..... *H04W 56/0045* (2013.01); *H04J 11/0069* (2013.01); *H04W 52/0216* (2013.01);
(Continued)

(58) Field of Classification Search
None
See application file for complete search history.

(56) References Cited

U.S. PATENT DOCUMENTS

| 5,229,996 A | 7/1993 | Backstrom et al. |
| 5,373,506 A | 12/1994 | Tayloe et al. |

(Continued)

FOREIGN PATENT DOCUMENTS

| CN | 1379963 A | 11/2002 |
| CN | 1129340 C | 11/2003 |

(Continued)

OTHER PUBLICATIONS

3GPP TS 36.212 V8.8.0 , "Technical Specification Group Radio Access Network; Evolved Universal Terrestrial Radio Access (E-UTRA); Multiplexing and channel coding (Release 8)", 3rd Generation Partnership Project.
(Continued)

*Primary Examiner* — Anh Ngoc M Nguyen
(74) *Attorney, Agent, or Firm* — Flaster Greenberg, P.C.

(57) ABSTRACT

A Node-B sends a polling message to a wireless transmit/receive unit (WTRU). The WTRU sends an uplink synchronization burst in response to the polling message without contention. The Node-B estimates an uplink timing shift based on the synchronization burst and sends an uplink timing adjustment command to the WTRU. The WTRU then adjusts uplink timing based on the uplink timing adjustment command. Alternatively, the Node-B may send a scheduling message for uplink synchronization to the WTRU. The WTRU may send a synchronization burst based on the scheduling message. Alternatively, the WTRU may perform contention-based uplink synchronization after receiving a synchronization request from the Node-B. The WTRU may enter an idle state instead of performing a handover to a new cell when the WTRU moves to the new cell. A discontinuous
(Continued)

reception (DRX) interval for the WTRU may be set based on activity of the WTRU.

20 Claims, 2 Drawing Sheets

Related U.S. Application Data continuation of application No. 16/530,178, filed on Aug. 2, 2019, now Pat. No. 10,764,857, which is a continuation of application No. 15/846,131, filed on Dec. 18, 2017, now Pat. No. 10,433,271, which is a continuation of application No. 14/848,507, filed on Sep. 9, 2015, now Pat. No. 9,900,857, which is a continuation of application No. 11/689,771, filed on Mar. 22, 2007, now Pat. No. 9,167,546.

(60) Provisional application No. 60/785,491, filed on Mar. 24, 2006.

(51) Int. Cl.
  *H04J 11/00* (2006.01)
  *H04W 72/21* (2023.01)
  *H04W 92/10* (2009.01)

(52) U.S. Cl.
  CPC ............ *H04W 72/21* (2023.01); *H04W 92/10* (2013.01); *Y02D 30/70* (2020.08)

(56) References Cited

U.S. PATENT DOCUMENTS

| | | |
|---|---|---|
| 5,518,663 A | 5/1996 | Labranche et al. |
| 5,636,243 A | 6/1997 | Tanaka et al. |
| 5,862,452 A | 1/1999 | Cudak et al. |
| 6,088,337 A | 7/2000 | Eastmond et al. |
| 6,351,522 B1 | 2/2002 | Vitikainen et al. |
| 6,418,127 B1 | 7/2002 | Laurent et al. |
| 6,477,382 B1 | 11/2002 | Mansfield et al. |
| 6,501,949 B1 | 12/2002 | Singleton et al. |
| 6,625,281 B1 | 9/2003 | Bernard et al. |
| 6,788,963 B2 | 9/2004 | Laroia et al. |
| 6,807,165 B2 | 10/2004 | Belcea et al. |
| 6,898,429 B1 | 5/2005 | Vialen et al. |
| 6,993,294 B2 | 1/2006 | Nobukiyo et al. |
| 7,133,702 B2 | 11/2006 | Amerga et al. |
| 7,286,563 B2 | 10/2007 | Chang et al. |
| 7,298,716 B2 | 11/2007 | Abraham et al. |
| 7,336,638 B2 | 2/2008 | Cheng et al. |
| 7,505,795 B1 | 3/2009 | Lim et al. |
| 7,706,350 B2 | 4/2010 | Gorokhov et al. |
| 7,872,986 B2 | 1/2011 | Chun et al. |
| 7,916,675 B2 | 3/2011 | Dalsgaard et al. |
| 8,145,135 B2 | 3/2012 | Dalsgaard et al. |
| 8,238,260 B2 | 8/2012 | Terry et al. |
| 8,644,250 B2 | 2/2014 | Chun et al. |
| 10,433,271 B2 | 10/2019 | Wang et al. |
| 2002/0058482 A1 | 5/2002 | Agin et al. |
| 2002/0105940 A1 | 8/2002 | Forssell et al. |
| 2003/0202500 A1 | 10/2003 | Ha et al. |
| 2003/0210668 A1 | 11/2003 | Malladi et al. |
| 2004/0085926 A1 | 5/2004 | Hwang et al. |
| 2004/0087320 A1 | 5/2004 | Kim et al. |
| 2004/0100940 A1 | 5/2004 | Kuure et al. |
| 2004/0147271 A1 | 7/2004 | Billon et al. |
| 2004/0185918 A1 | 9/2004 | Fan et al. |
| 2004/0198411 A1 | 10/2004 | Cheng et al. |
| 2004/0229659 A1 | 11/2004 | Boos et al. |
| 2005/0032555 A1 | 2/2005 | Jami et al. |
| 2005/0049012 A1 | 3/2005 | Chang et al. |
| 2005/0063386 A1 | 3/2005 | Owen et al. |
| 2005/0117530 A1 | 6/2005 | Abraham et al. |
| 2005/0148348 A1 | 7/2005 | Cramby et al. |
| 2005/0153751 A1 | 7/2005 | Bultan et al. |
| 2005/0176474 A1 | 8/2005 | Lee et al. |
| 2005/0186959 A1 | 8/2005 | Vialen et al. |
| 2005/0201474 A1 | 9/2005 | Cho et al. |
| 2005/0207385 A1 | 9/2005 | Gorokhov et al. |
| 2005/0221833 A1 | 10/2005 | Granzow et al. |
| 2005/0232271 A1 | 10/2005 | Kettunen et al. |
| 2006/0019641 A1 | 1/2006 | Vayanos et al. |
| 2006/0056342 A1 | 3/2006 | Lee et al. |
| 2006/0195576 A1 | 8/2006 | Rinne et al. |
| 2006/0198340 A1 | 9/2006 | Murata et al. |
| 2006/0258383 A1 | 11/2006 | Jiang et al. |
| 2006/0262739 A1 | 11/2006 | Ramirez et al. |
| 2007/0133479 A1 | 6/2007 | Montejo et al. |
| 2007/0140386 A1 | 6/2007 | Howard |
| 2007/0206531 A1* | 9/2007 | Pajukoski ............ H04W 74/002 370/329 |
| 2007/0218835 A1 | 9/2007 | Hindelang et al. |
| 2007/0291673 A1 | 12/2007 | Demirhan et al. |
| 2007/0291729 A1 | 12/2007 | Dalsgaard et al. |
| 2008/0045228 A1* | 2/2008 | Zhang .................. H04L 1/0026 455/450 |
| 2008/0046132 A1 | 2/2008 | Dalsgaard et al. |
| 2008/0167089 A1 | 7/2008 | Suzuki et al. |
| 2008/0225772 A1 | 9/2008 | Xu |
| 2008/0232284 A1 | 9/2008 | Dalsgaard et al. |
| 2008/0232310 A1 | 9/2008 | Xu |
| 2008/0293426 A1 | 11/2008 | Kim et al. |
| 2009/0268689 A1 | 10/2009 | Fu et al. |

FOREIGN PATENT DOCUMENTS

| | | |
|---|---|---|
| CN | 1486579 A | 3/2004 |
| CN | 1549612 A | 11/2004 |
| CN | 1685745 A | 10/2005 |
| EP | 536099 A1 | 4/1993 |
| EP | 1499144 A1 | 1/2005 |
| EP | 1511337 A1 | 3/2005 |
| EP | 1613107 A2 | 1/2006 |
| GB | 2328588 A | 2/1999 |
| JP | 2005260906 A | 9/2005 |
| RU | 2120181 C1 | 11/2004 |
| RU | 2173502 C2 | 11/2004 |
| RU | 2216100 C2 | 11/2004 |
| RU | 2242092 C2 | 11/2004 |
| RU | 2262196 C2 | 11/2004 |
| RU | 2263400 C2 | 11/2004 |
| TW | 200404466 A | 3/2004 |
| TW | 200610298 A | 3/2006 |
| TW | 1361586 B | 4/2012 |
| WO | WO 97/41658 A1 | 11/1997 |
| WO | WO 00/22837 A2 | 4/2000 |
| WO | WO 01/24411 A1 | 4/2001 |
| WO | WO 01/41374 A1 | 6/2001 |
| WO | WO 01/60103 A1 | 8/2001 |
| WO | WO 02/056627 A1 | 7/2002 |
| WO | WO 2004/077919 A2 | 9/2004 |
| WO | WO 2004/102833 A1 | 11/2004 |
| WO | WO 2005/048506 A1 | 5/2005 |
| WO | WO 2005/067172 A1 | 7/2005 |
| WO | WO 2005/117299 A1 | 12/2005 |
| WO | WO 2006/039812 A1 | 4/2006 |
| WO | WO 2006/118411 A2 | 11/2006 |
| WO | WO 2006/135187 A2 | 12/2006 |
| WO | WO 2007/149732 A1 | 12/2007 |
| WO | WO 2007/111941 A3 | 2/2008 |

OTHER PUBLICATIONS

3GPP TS 36.300 V8.12.0, "Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3rd Generation Partnership Project.

3GPP TS 36.321 V8.12.0, "Technical Specification Group Radio Access Network; Evolved Universal Terrestrial Radio Access (E-UTRA); Medium Access Control (MAC) protocol specification (Release 8)", 3rd Generation Partnership Project.

(56) References Cited

OTHER PUBLICATIONS

3GPP TS 36.331 V8.21.0 , "Technical Specification Group Radio Access Network; Evolved Universal Terrestrial Radio Access (E-UTRA); Radio Resource Control (RRC); Protocol specification (Release 8)", 3rd Generation Partnership Project.
TSGR2#4(99)413 , "Discontinuous Reception in Idle and Connected mode", Third Generation Partnership Project (3GPP), Ericsson, TSG-RAN Working Group 2 (Radio layer 2 and Radio layer 3), May 25-May 28, 1999, Berlin, Germany, May 25, 1999-May 28, 1999, 3 pages.
3rd Generation Partnership Project (3GPP), "Technical Specification Group Radio Access Network; Continuous Connectivity for Packet Data Users; (Release 7)", 3GPP TR 25.903 V0.3.0, Feb. 2006, 54 pages.
"First Instance Decision on Petition for Invalidation", National Intellectual Administration, PRC, Nov. 10, 2021, 15 pages, Case No. 4W109263, Chinese Patent No. ZL 201310036589.6, Chinese and English Translations.
"Invalidation Decision on Petition for Invalidation", National Intellectual Administration, PRC, Jan. 20, 2020, 16 pages, Case No. 4W109263, Chinese Patent No. ZL 201310036589.6, Chinese and English Translations.
3rd Generation Partnership Project (3GPP), R1-060503, "Uplink Timing Control Signal Resource Allocation", ZTE, 3GPP TSG RAN WG1 #44, Denver, USA, Feb. 13-17, 2006, pp. 1-3.
3rd Generation Partnership Project (3GPP), R1-060591, "Uplink DPCCH Gating—Link Level Performance", Nokia, 3GPP TSG-RAN WG1 Meeting #44, Denver, USA, Feb. 13-17, 2006, 4 pages.
3rd Generation Partnership Project (3GPP), R1-060601, "Scalable band Width & Physical Channel Mapping for L1/L2 Control Channel", NEC Group, NTT DoCoMo, TSG-RAN WG1 Meeting #44, Denver USA, Feb. 13-17, 2006, pp. 1-6.
3rd Generation Partnership Project (3GPP), R1-14000903, "Uplink Synchronous Transmission Scheme (USTS)", SK Telecom, TSG-RAN Working Group 1 Meeting #14, Oulu, Finland, Jul. 4-7, 2000, 5 pages.
3rd Generation Partnership Project (3GPP), R1-799c35, "Uplink Synchronization Transmission Scheme", SK Telecom, TSG-RAN Working Group 1 Meeting #7, Hannover, Germany, Aug. 30-Sep. 3, 1999, pp. 1-3.
3rd Generation Partnership Project (3GPP), R2-060004, "Adaptive UE Feedback Channel for Downlink Scheduling Decision in LTE", Alcatel, 3GPP TSG-RAN WG 2 Meeting #50, Sophia-Antipolis, France, Jan. 9- 13, 2006, pp. 1-4.
3rd Generation Partnership Project (3GPP), R2-0601006, "UL Timing Sync Procedure", Samsung, 3GPP TSG RAN2#52, Athens, Greece, Mar. 27-31, 2006, pp. 1-4.
3rd Generation Partnership Project (3GPP), R2-060591, "MAC Procedures for DRX and DTX in LTE_Active", Ericsson, TSG-RAN WGx Meeting #51, Denver, US, Feb. 13-17, 2006, pp. 1-4.
3rd Generation Partnership Project (3GPP), R2-060888, "DRX and DTX Operation in LTE_Active", Panasonic, 3GPP TSG-RAN WG2 Meeting #52, Athens, Greece, Mar. 27-31, 2006, 3 pages.
3rd Generation Partnership Project (3GPP), R2-060967, "DRX and DTX in LTE Active", Ericsson, TSG-RAN WG2 Meeting #52, Athens, Greece, Mar. 27-31, 2006, 5 pages.
3rd Generation Partnership Project (3GPP), R2-061002, "UE State Transition in LTE_Active", LG Electronics Inc., 3GPP TSG-RAN WG2 #52, Athens, Greece, Mar. 27-31, 2006, pp. 1-4.
3rd Generation Partnership Project (3GPP), R2-061014, "Discussion on LTE Paging and DRX", LG Electronics, Joint RAN WG1 and RAN WG2 on LTE, Athens, Greece, Mar. 27-31, 2006, pp. 1-2.
3rd Generation Partnership Project (3GPP), R2-062803, "Periodic Resource Assignment for Uplink Synchronization Transmission in LTE Active Mode", InterDigital Communications Corporation, 3GPP TSG RAN WG2 #55, Seoul, Korea, Oct. 9-13, 2006, 4 pages.
3rd Generation Partnership Project (3GPP), R2-070265, "DRX Scheme", LG Electronics, 3GPP TSG-RAN WG2 #56bis, Sorrento, Italy, Jan. 15-19, 2007, pp. 1-4.
3rd Generation Partnership Project (3GPP), R2-070279, "Views on DRX/DTX Control in LTE", NTT DoComo, Inc., GPP TSG RAN WG2 #56bis, Sorrento, Italy, Jan. 15-19, 2007, 3 pages.
3rd Generation Partnership Project (3GPP), R2-070896, "Draft 2 Minutes of the 56bis TSG-RAN WG2 Meeting", 3GPP Support Team, TSG-RAN WG2 Meeting #57, Sorrento, Italy, Jan. 15-19, 2007, pp. 1-82.
3rd Generation Partnership Project (3GPP), R2-051949, "RRC States in Evolved UTRAN", Ericsson, TSG-RAN WG2 Meeting #48, London, UK, Aug. 29-Sep. 2, 2005, pp. 1-5.
3rd Generation Partnership Project (3GPP), TR 25.813 V0.6.0, "Technical Specification Group Radio Access Network, Evolved Universal Terrestrial Radio Access (E-UTRA) and Evolved Universal Terrestrial Radio Access Network (E-UTRAN), Radio Interface Protocol Aspects (Release 7)", Mar. 2006, pp. 1-26.
3rd Generation Partnership Project (3GPP), TR 25.814 V1 .2.1, "Technical Specification Group Radio Access Network, Physical Layer Aspects for Evolved UTRA (Release 7)", Feb. 2006, pp. 1-84.
3rd Generation Partnership Project (3GPP), TR 25.814 V7.1.0, "Technical Specification Group Radio Access Network, Physical Layer Aspects for Evolved Universal Terrestrial Radio Access (UTRA) (Release 7)", Sep. 2006, pp. 1-132.
3rd Generation Partnership Project (3GPP), TR 25.903 V0.3.0, "Technical Specification Group Radio Access Network, Continuous Connectivity for Packet Data Users (Release 7)", Feb. 2006, 54 pages.
3rd Generation Partnership Project (3GPP), TR 25.912 V0.0.4, "Technical Specification Group Radio Access Network, Feasibility Study for Evolved UTRA and UTRAN (Release 7)", Mar. 2006, pp. 1-13.
3rd Generation Partnership Project (3GPP), TR 25.912 V7.1.0, "Technical Specification Group Radio Access Network, Feasibility Study for Evolved Universal Terrestrial Radio Access (UTRA) and Universal Terrestrial Radio Access Network (UTRAN) (Release 7)", Sep. 2006, pp. 1-57.
3rd Generation Partnership Project (3GPP), TS 25.321 V7.3.0, "Technical Specification Group Radio Access Network, Medium Access Control (MAC) Protocol Specification (Release 7)", Dec. 2006, pp. 1-113.
3rd Generation Partnership Project (3GPP), TS 25.331 V7.3.0, "Technical Specification Group Radio Access Network, Radio Resource Control (RRC), Protocol Specification (Release 7)", Dec. 2006, pp. 1-1316.
3rd Generation Partnership Project (3GPP), TS 25.331 V8.1.0, "Technical Specification Group Radio Access Network, Radio Resource Control (RRC), Protocol Specification (Release 8)", Dec. 2007, pp. 1-1471.
3rd Generation Partnership Project (3GPP), TS 36.300 V0.3.1, "Technical Specification Group Radio Access Network, Evolved Universal Terrestrial Radio Access (E-UTRA) and Evolved Universal Terrestrial Radio Access Network (E-UTRAN), Stage 2 (Release 8)", Nov. 2006, pp. 1-72.
3rd Generation Partnership Project (3GPP), TS 36.300 V1.0.0, "Technical Specification Group Radio Access Network; Evolved Universal Terrestrial Radio Access (E-UTRA) and Evolved Universal Terrestrial Radio Access Network (E-UTRAN), Overall Description, Stage 2 (Release 8)", Mar. 2007, pp. 1-82.
3rd Generation Partnership Project (3GPP), TS 36.300 V8.3.0, "Technical Specification Group Radio Access Network, Evolved Universal Terrestrial Radio Access (E-UTRA) and Evolved Universal Terrestrial Radio Access Network (E-UTRAN), Overall Description, Stage 2 (Release 8)", Dec. 2007, pp. 1-121.
European Telecommunications Standards Institute (ETSI), ETSI TS 136 321 V8.12.0, "Technical Specification Group Radio Access Network, Evolved Universal Terrestrial Radio Access (E-UTRA), Medium Access Control (MAC) Protocol Specification (Release 8)", Mar. 2012, 49 pages.
CNIPA "National Intellectual Property Administration, PRC for Reexamination and Invalidation Examination", Examination Decision on Request for Invalidation (No. 43071) of Chinese Patent No. 201310036589.6, dated Jan. 20, 2020, 16 pages.

(56) References Cited

OTHER PUBLICATIONS

R2-060897, "User Identities in LTE", 6.2.1, NTT DoCoMo, Inc., 3GPP TSG-RAN WG2 Meeting #52, Mar. 27-31, 2006, Athens, Greece, 2 pages.

* cited by examiner

METHOD AND APPARATUS FOR MAINTAINING UPLINK SYNCHRONIZATION AND REDUCING BATTERY POWER CONSUMPTION

CROSS REFERENCE TO RELATED APPLICATION

This application is a continuation of U.S. Non-Provisional application Ser. No. 16/935,035, filed Jul. 21, 2020, which is a continuation of U.S. Non-Provisional application Ser. No. 16/530,178, filed Aug. 2, 2019, which is a continuation of U.S. Non-Provisional application Ser. No. 15/846,131, filed Dec. 18, 2017 and issued as U.S. Pat. No. 10,433,271, which is a continuation of U.S. Non-Provisional application Ser. No. 14/848,507, filed Sep. 9, 2015 and issued as U.S. Pat. No. 9,900,857, which is a continuation of U.S. Non-Provisional application Ser. No. 11/689,771, which was filed Mar. 22, 2007 and issued as U.S. Pat. No. 9,167,546, which claims the benefit of U.S. Provisional Application No. 60/785,491 filed Mar. 24, 2006, the disclosures of which are incorporated by reference as if fully set forth.

FIELD OF INVENTION

The present invention is related to wireless communication systems. More particularly, the present invention is related to a method and apparatus for maintaining uplink synchronization and reducing battery power consumption of a wireless transmit/receive unit (WTRU).

BACKGROUND

In a conventional third generation partnership project (3GPP) system, there are four non-idle radio resource control (RRC) states roughly corresponding to four levels of WTRU activity: a dedicated channel (DCH) cell level (Cell_DCH) state, a forward access channel (FACH) cell level (Cell_FACH) state, a paging channel (PCH) cell level (Cell_PCH) state, and a universal terrestrial radio access network (UTRAN) registration area (URA) PCH (URA_PCH) state. In a Cell_DCH state, a WTRU has a dedicated physical channel for data transport. In a Cell_FACH state, no dedicated channel is allocated to the WTRU, but the WTRU may use a random access channel (RACH) and a FACH channel for conveying and receiving signaling as well as user plane data. It is not efficient to send a large amount of user plane data in the Cell_FACH state. A Cell_PCH state reduces battery consumption by only listening to a PCH in a discontinuous reception (DRX) mode. As with the Cell_DCH and Cell_FACH states, the location of a WTRU in the Cell_PCH state is known at the cell level. A WTRU in the Cell_PCH state temporarily enters a Cell_FACH state when it relocates to a new cell in order to communicate its new location information. A URA_PCH state is similar to the Cell_PCH state, except that in the URA_PCH state the network is only informed when the WTRU moves to a new URA. When a WTRU changes cells, the WTRU generally stays in the same state. Currently, handovers in the Cell_DCH state are network-directed.

A WTRU that is in an active state has a non-access stratum (NAS) connectivity so that the WTRU may communicate to nodes in a core network. A WTRU in an active state also has an access stratum (AS) connectivity such that a radio bearer configuration, (e.g., WTRU capability exchange, ciphering, or the like), has been completed for the WTRU.

A WTRU in an idle state consumes less power and resources than a WTRU in a low-power active state. One important characteristic of a WTRU in an idle state is that the WTRU does not have to participate in an active mode handover. In other words, when a WTRU in an idle state moves from one cell to another, the WTRU does not configure radio bearers with the new cell if the WTRU remains in an idle state.

One of the goals in a next generation wireless communication system is maintaining an "always on" connectivity. However, for a battery-powered WTRU, battery power consumption is an issue. The "always on" connectivity is a desirable feature, but this tends to shorten the battery life.

Currently in 3GPP, a WTRU maintains uplink synchronization whenever it has a dedicated channel to a base station. The WTRU always maintains uplink synchronization in a Cell_DCH state. The WTRU also resynchronizes its uplink any time it has a new set of dedicated channels disjoint from its prior set. Maintaining uplink synchronization, (conventionally via RACH transmissions), is one of the sources for consuming the battery power of the WTRU.

Therefore, it would be desirable to provide a scheme for maintaining uplink synchronization efficiently and reducing battery power consumption while the WTRU is in an active state.

SUMMARY

The present invention is related to a method and apparatus for maintaining uplink synchronization and reducing battery power consumption of a WTRU. A Node-B sends a polling message to a WTRU. The WTRU sends an uplink synchronization burst in response to the polling message without contention. The Node-B estimates an uplink timing shift based on the uplink synchronization burst and sends an uplink timing adjustment command to the WTRU without contention. The WTRU then adjusts uplink timing based on the uplink timing adjustment command. Alternatively, the Node-B may send a scheduling message for uplink synchronization to the WTRU. The WTRU may send the uplink synchronization burst based on the scheduling message. Alternatively, the WTRU may perform contention-based uplink synchronization after receiving a synchronization request from the Node-B. The WTRU may enter an idle state instead of performing a handover to a new cell when the WTRU moves to the new cell. A DRX interval for the WTRU may be set based on activity of the WTRU.

BRIEF DESCRIPTION OF THE DRAWINGS

A more detailed understanding of the invention may be had from the following description of a preferred embodiment, given by way of example and to be understood in conjunction with the accompanying drawings wherein.

DETAILED DESCRIPTION OF THE PREFERRED EMBODIMENTS

When referred to hereafter, the terminology "WTRU" includes but is not limited to a user equipment (UE), a mobile station (STA), a fixed or mobile subscriber unit, a pager, a cellular telephone, a personal digital assistant (PDA), a computer, or any other type of user device capable of operating in a wireless environment. When referred to hereafter, the terminology "Node-B" includes but is not limited to a base station, a site controller, an access point (AP), or any other type of interfacing device capable of operating in a wireless environment.

The present invention is applicable to any wireless communication systems including, but not limited to, wideband code division multiple access (WCDMA) and long term evolution (LTE) of 3GPP cellular networks beyond 3GPP Release 7.

Figure 1:
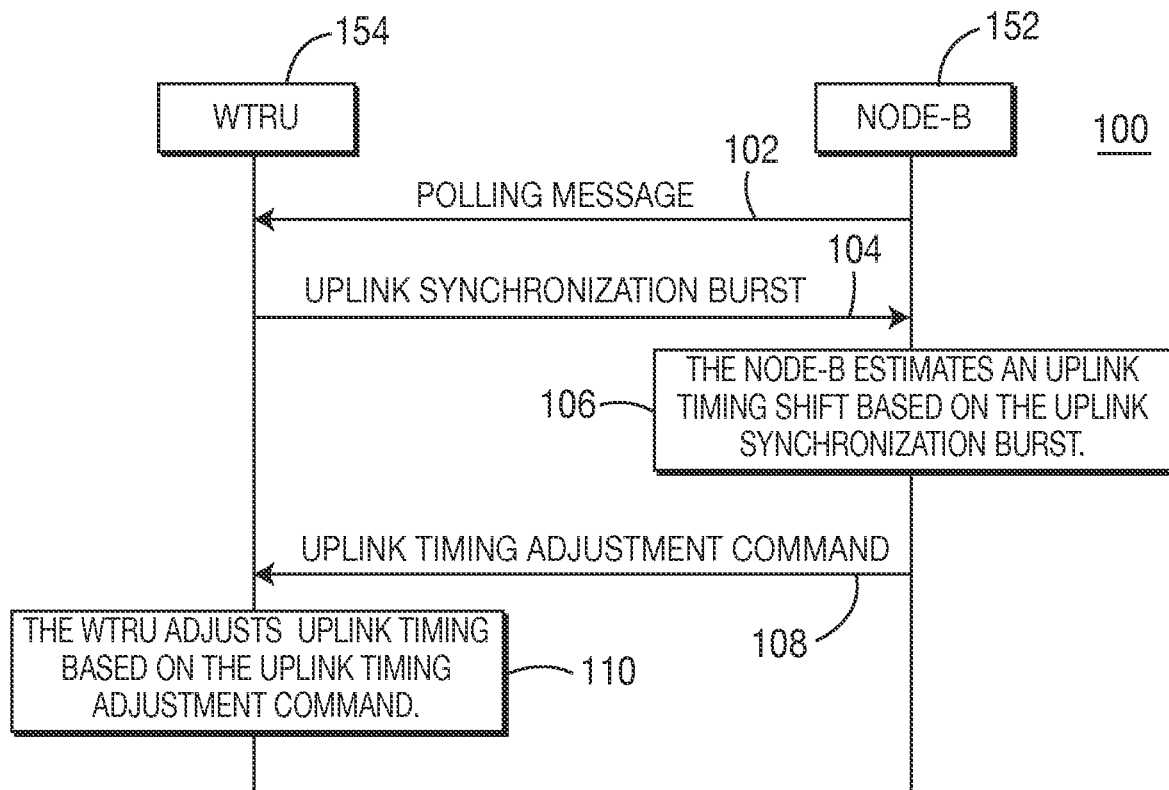
FIG. 1 is a signaling diagram of a process for maintaining uplink synchronization using a contention free procedure in accordance with one embodiment of the present invention.

FIG. 1 is a signaling diagram of a process 100 for maintaining uplink synchronization using a contention-free procedure in accordance with one embodiment of the present invention. For uplink synchronization, a Node-B 152 sends a polling message to a WTRU 154 to request transmission of an uplink synchronization burst (step 102). The WTRU 154 may receive the polling message either during registration or via broadcasting after registration. The polling message indicates a specific time, (e.g., a system frame number or transmission time interval (TTI)), and/or resource for sending the uplink synchronization burst so that the specific WTRU may send the uplink synchronization burst without contending against other WTRUs. In response to the polling message, the WTRU 154 sends an uplink synchronization burst based on the parameters, (e.g., a specific time, a resource, or the like), included in the polling message (step 104). The Node-B 152 receives the uplink synchronization burst and estimates an uplink timing shift based on the uplink synchronization burst (step 106). The Node-B 152 sends an uplink timing adjustment command to the WTRU 154 (step 108). The WTRU 154 then adjusts uplink timing based on the uplink timing adjustment command (step 110).

The polling message may include uplink interference information so that the WTRU 154 may use the information in determining uplink transmit power for the uplink synchronization burst. Alternatively, the Node-B 152 may explicitly indicate an uplink transmit power for the uplink synchronization burst. The Node-B 152 may send the polling message via a downlink common control channel granting an access to an uplink shared channel for the uplink synchronization burst.

Alternatively, to save an additional power, the WTRU 154 may enter a DRX mode and wake at predetermined intervals for either paging or uplink shared channel allocation. If the WTRU 154 enters a DRX mode, the Node-B 152 does not need to send the polling messages to the WTRU 154 very often. The network configures a periodicity on how often the Node-B 152 should send the polling message to the WTRU 154. This periodicity information can be sent to the WTRU 154 through a broadcast message. In this way, the WTRU 154 may only wake up at the moment when the polling message is expected. After listening to the polling message and perform the necessary uplink transmissions, the WTRU 154 reenters the DRX mode in order to save the battery power.

The polling message may address several WTRUs containing parameters for several polled WTRUs to send their uplink synchronization bursts. A polling rate may be different for each WTRU. The polling rate may be determined based on the estimated clock drift and/or mobility of the WTRUs. The polling rate may be adaptively changed by either the WTRU 154, (via a request to the Node-B 152), or the Node-B 152. The polling rate may be different for each RRC (or medium access control (MAC)) state of the WTRU 154. The polling rate may increase over time, (e.g., exponentially), as the period of inactivity of the WTRU 154 increases. The Node-B 152 may use the results of the uplink synchronization as one factor in adaptively changing the polling rate for the WTRU 154. An uplink channel allocation for the uplink synchronization burst provided by the polling message may be periodic or may optionally indicate duration of the uplink channel.

Since the WTRU 154 in the active state is already known to the Node-B 152 and the Node-B 152 can uniquely identify the WTRU 154 via the scheduled times for the WTRU 154, the WTRU 154 may omit a cell ID or a WTRU ID, (e.g., a control radio network temporary identity (C-RNTI)), in the uplink synchronization burst. This will reduce an overhead.

Alternatively, the Node-B 152 may include a short, (preferably random), identifier, tag or a sequence number in the polling message, and the WTRU 154 may use the same short identifier, tag or sequence number in the uplink synchronization burst. Since this identifier, tag, or sequence number is smaller than other forms of identification, (e.g., a cell ID or a C-RNTI), the overhead is reduced.

Figure 2:
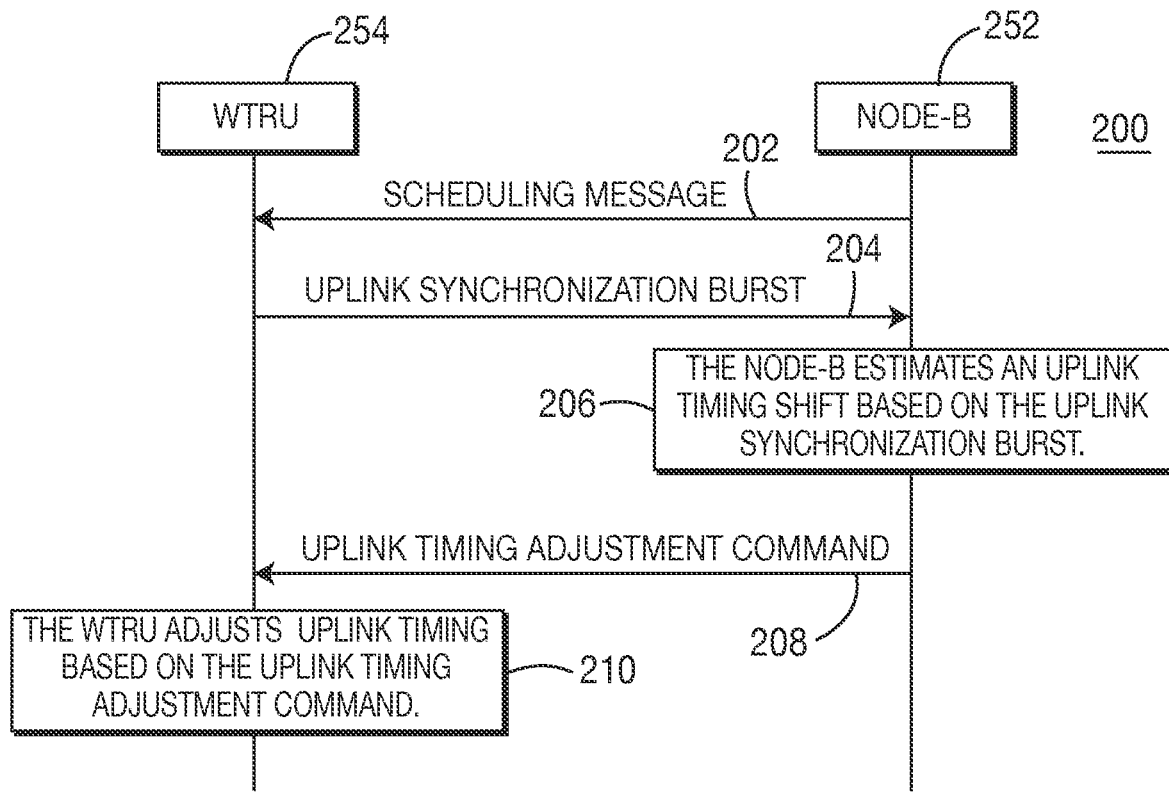
FIG. 2 is a signaling diagram of a process for maintaining uplink synchronization using a contention free procedure in accordance with another embodiment of the present invention.

FIG. 2 is a signaling diagram of a process 200 for maintaining uplink synchronization using a contention-free procedure in accordance with another embodiment of the present invention. A Node-B 252 generates a schedule for uplink synchronization for a WTRU 254 and sends a scheduling message for uplink synchronization to the WTRU 254 (step 202). The scheduling message may include a schedule for several WTRUs. Uplink synchronization is performed at predetermined times using a predetermined resource specified in the scheduling message. The Node-B 252 may signal the resource for uplink synchronization to the WTRU 254 prior to the scheduled synchronization time. The scheduling message may include uplink interference information or uplink transmit power information. The uplink transmit power information may be for a group of WTRUs if they are in a similar situation. Alternatively, the uplink transmit power information may be for each WTRU or may just be used as a reference. The scheduling message may be transmitted via a downlink common control channel granting an access to an uplink shared channel for the synchronization burst.

The WTRU 254 sends an uplink synchronization burst based on the scheduling message (step 204). The WTRU 254 may optionally indicate the next synchronization time in the uplink synchronization burst, (i.e., the synchronization burst payload may include a field indicating the next synchronization time). This synchronization time may be viewed as a recommendation by the Node-B 252, and the Node-B 252 may modify the schedule or the recommendation by sending a signal via a downlink signaling channel, (e.g., a shared control channel). The WTRU 254 may also send a scheduling request informing the amount of data waiting for transmission in the WTRU 254. The WTRU 254 may also send measurement results such as a channel quality indicator (CQI).

The Node-B 252 estimates an uplink timing shift based on the uplink synchronization burst (step 206). The Node-B 252 sends an uplink timing adjustment command to the WTRU 254 (step 208). The WTRU 254 then adjusts uplink timing based on the uplink timing adjustment command (step 210).

Since the WTRU 254 in an active state is already known to the Node-B 252 and the Node-B 252 can uniquely identify the WTRU 254 via the scheduled times for the WTRU 254, the WTRU 254 may omit a cell ID or a WTRU ID, (e.g., a C-RNTI), in the uplink synchronization burst. This will reduce an overhead.

Alternatively, the Node-B 252 may include a short, (preferably random), identifier, tag or a sequence number in the scheduling message, and the WTRU 254 may use the same short identifier, tag or sequence number in the uplink synchronization burst. Since this identifier, tag, or sequence number is smaller than other forms of identification, (e.g., a cell ID or a C-RNTI), the overhead is reduced.

Figure 3:
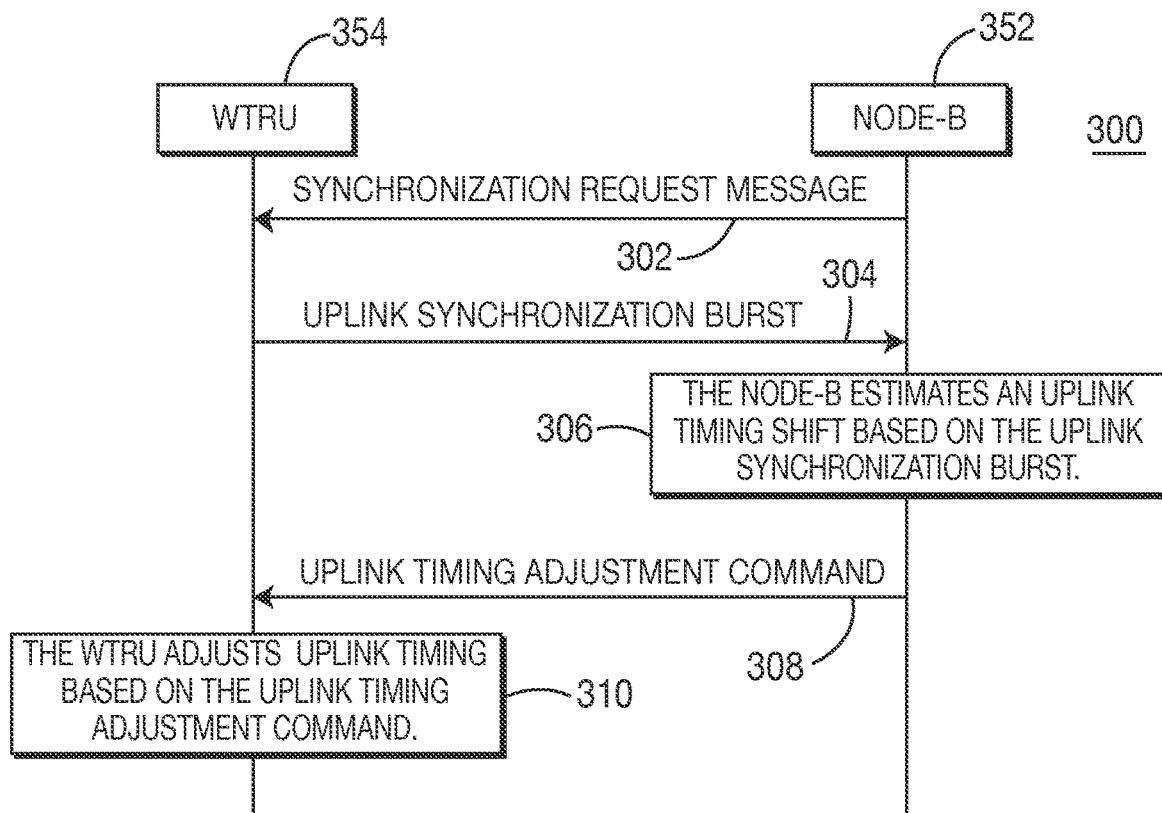
FIG. 3 is a signaling diagram of a process for uplink synchronization using a contention-based procedure in accordance with the present invention.

FIG. 3 is a signaling diagram of a process 300 for uplink synchronization using a contention-based procedure in accordance with the present invention. A Node-B 352 sends a synchronization request message to a WTRU 354 instructing or recommending the WTRU 354 to perform an uplink synchronization procedure during the WTRU 354 is in an active state (step 302). The synchronization request message may address multiple WTRUs. The synchronization request message may include a specific time and/or resource for the WTRU to send the synchronization burst. The synchronization request message may include uplink interference information or uplink transmit power information. The synchronization request message may be transmitted via a downlink common control channel granting an access to an uplink shared channel for the synchronization burst.

In response, the WTRU 354 performs the conventional contention-based procedure for uplink synchronization. The WTRU 354 sends an uplink transmission, (e.g., an RACH preamble), to the Node-B 352, (e.g., via an RACH), using a contention-based mechanism, (e.g., a slotted Aloha mechanism) (step 304). Either non-synchronized or synchronized RACH can be used for this uplink transmission, which is indicated either through an RRC signaling or by the synchronization request message from the Node-B 352. The Node-B 352 receives the uplink transmission and estimates an uplink timing shift based on the uplink transmission (step 306). The Node-B 352 sends an uplink timing adjustment command to the WTRU 354 (step 308). The WTRU 354 then adjusts uplink timing based on the uplink timing adjustment command (step 310).

The Node-B 352 may include a short, (preferably random), identifier, tag or a sequence number in the uplink synchronization request message, and the WTRU 354 may use the same short identifier, tag or sequence number in the uplink synchronization burst.

The Node-B 352 may designate a frame, a sub-frame or a timeslot in which the uplink synchronization procedure (or random access procedures) should be performed while the WTRU 354 is in an active state. The designated frame, sub-frame or timeslot is different than the frames, sub-frames or timeslots that are used to perform the uplink synchronization procedure (or random access procedures) during the WTRU 354 is in an idle state, (i.e. different than the RACH timeslots). The designation of the frame, sub-frame or timeslot may be performed via prior signaling, (e.g., broadcast messages), or via pre-configuration. The Node-B 352 may provide different service levels or meet the different performance requirements or targets for WTRUs in an active state as opposed to WTRUs in an idle state. When a WTRU 354 is in an active state, in order to support the active traffic, more tightly maintained uplink synchronization is required. Therefore, the WTRU 354 may need to send uplink synchronization transmission more frequently compared to an idle state which requires less tight uplink synchronization since there is no active traffic going on.

In all the above embodiments, the Node-B may include a flag in the polling message, the scheduling message or the synchronization request message to indicate whether it is mandatory or optional that the WTRU performs the procedure for uplink synchronization. Commanding the WTRU to perform uplink synchronization, (i.e., setting the flag to "mandatory"), is useful when the Node-B needs to send packets to the WTRU, (e.g., high speed downlink packet access (HSDPA)), since the WTRU needs to be uplink synchronized in order to send a hybrid automatic repeat request (H-ARQ) positive feedback. Preferably, the flag is included within the polling message, the scheduling message or the synchronization request message. If the flag indicates the uplink synchronization is optional, the WTRU may or may not perform the uplink synchronization procedure.

Figure 4:
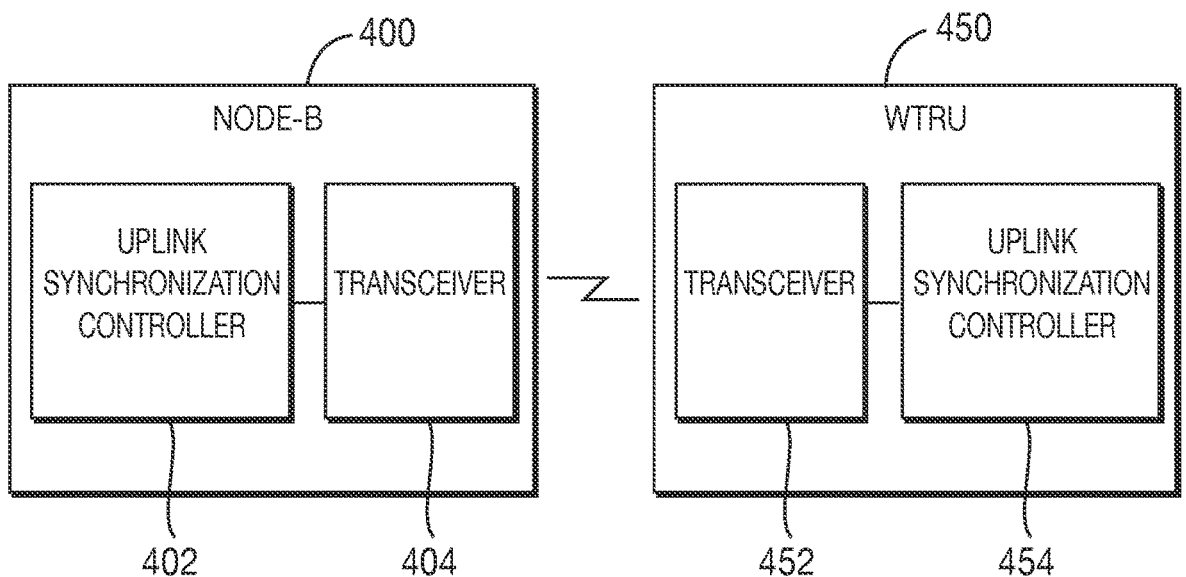
FIG. 4 is a block diagram of a Node-B and a WTRU configured in accordance with the present invention.

FIG. 4 is a block diagram of a Node-B 400 and a WTRU 450 configured in accordance with the present invention. The Node-B 400 includes an uplink synchronization controller 402 and a transceiver 404. The WTRU 450 includes a transceiver 452 and an uplink synchronization controller 454. The uplink synchronization controller 402 generates a polling message, a scheduling message or a synchronization request message for the WTRU 450. The transceiver 404 transmits the polling message, the scheduling message or the synchronization request message to the WTRU 450. The transceiver 452 of the WTRU 450 receives the polling message, the scheduling message or the synchronization request message, and sends an uplink synchronization burst based on the polling message, the scheduling message or the synchronization request message to the Node-B 400.

The uplink synchronization controller 402 estimates an uplink timing shift based on an uplink synchronization burst transmitted by the WTRU 450, and generates an uplink timing adjustment command. The transceiver 404 then sends the uplink timing adjustment command to the WTRU 450. The uplink synchronization controller 454 of the WTRU 450 then adjusts uplink timing based on the uplink timing adjustment command.

In accordance with another embodiment of the present invention, a WTRU may use cell reselection as a trigger to go from a low-power active state to an idle state. When a WTRU, through its cell search and cell reselection procedures, determines that the WTRU should move to a new cell, the WTRU may enter an idle state, instead of performing a handover and radio bearer reconfiguration. In this manner, the WTRU may conserve power by avoiding the control signaling associated with the handover and radio bearer reconfiguration.

In accordance with yet another embodiment of the present invention, a DRX interval, (i.e., the WTRU's wake-up time intervals for reception), may be configured adaptively according to a service level, (i.e., activity of the WTRU). The DRX interval is increased as the period of inactivity of the WTRU increases subject to a predetermined maximum value. The DRX interval may be increased exponentially. Preferably, the network determines the DRX interval and signals it to the WTRU.

Alternatively, the WTRU may inform the Node-B whether the WTRU is currently powered by a battery or a constant power supply, so that the DRX interval is set accordingly. The WTRU may inform the Node-B of its currently remaining battery capacity and other characteristics, (such as consumed power in transmitting data), that may assist the Node-B in computing the estimated battery life. The Node-B then sets up power saving policies, (e.g., DRX interval), for the WTRU based on the information.

Although the features and elements of the present invention are described in the preferred embodiments in particular combinations, each feature or element can be used alone without the other features and elements of the preferred embodiments or in various combinations with or without other features and elements of the present invention. The methods or flow charts provided in the present invention may be implemented in a computer program, software, or firmware tangibly embodied in a computer-readable storage medium for execution by a general purpose computer or a processor. Examples of computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, radio network controller (RNC), or any host computer. The WTRU may be used in conjunction with modules, implemented in hardware and/or software, such as a camera, a video camera module, a videophone, a speakerphone, a vibration device, a speaker, a microphone, a television transceiver, a hands free headset, a keyboard, a Bluetooth® module, a frequency modulated (FM) radio unit, a liquid crystal display (LCD) display unit, an organic light-emitting diode (OLED) display unit, a digital music player, a media player, a video game player module, an Internet browser, and/or any wireless local area network (WLAN) module.

What is claimed is:

1. A method implemented by a wireless/transmit receive unit (WTRU), the method comprising:
   receiving information indicating a time and a resource for performing random access;
   transmitting a random-access channel (RACH) preamble and a payload in accordance with the received information;
   receiving a response after transmission of the RACH preamble and the payload, the response comprising a timing adjustment command.

2. The method of claim 1, further comprising adjusting uplink timing based on the timing adjustment command.

3. The method of claim 2, further comprising transmitting a hybrid automatic repeat request (H-ARQ) feedback after adjusting uplink timing based on the timing adjustment command.

4. The method of claim 1, wherein one or more of the RACH preambles or the payload are transmitted using an uplink shared channel.

5. The method of claim 1, further comprising receiving discontinuous reception (DRX) control information, the DRX control information indicating a time interval during which the WTRU is to monitor a downlink control channel.

6. The method of claim 1, wherein the information is received via a downlink control channel.

7. The method of claim 1, wherein the payload comprises one or more of a scheduling request, a channel quality indicator, or a field indicating a next synchronization time.

8. A wireless transmit/receive unit (WTRU), comprising a processor and memory, the processor and memory configured to:
   receive information from a network, the information indicating a time and a resource for performing random access;
   transmit a random-access channel (RACH) preamble and a payload in accordance with the received information;
   receive a response from the network after transmission of the RACH preamble and the payload, the response comprising a timing adjustment command.

9. The WTRU of claim 8, further configured to adjust uplink timing based on the timing adjustment command.

10. The WTRU of claim 8, further configured to transmit a hybrid automatic repeat request (H-ARQ) feedback after adjusting uplink timing based on the timing adjustment command.

11. The WTRU of claim 8, wherein one or more of the RACH preambles or the payload are transmitted using an uplink shared channel.

12. The WTRU of claim 8, further configured to receive discontinuous reception (DRX) control information, the DRX control information indicating a time interval during which the WTRU is to monitor a downlink control channel.

13. The WTRU of claim 8, wherein the information from the network is received via a downlink control channel.

14. The WTRU of claim 8, wherein the payload comprises one or more of a scheduling request, a channel quality indicator, or a field indicating a next synchronization time.

15. A network node comprising a processor and memory, the processor and memory configured to:
   send information to a wireless transmit/receive unit (WTRU), the information indicating a time and a resource for performing random access;
   receive a random-access channel (RACH) preamble and a payload after sending the information;
   send a response to the WTRU, wherein the response comprises a timing adjustment command.

16. The network node of claim 15, further configured to receive a hybrid automatic repeat request (H-ARQ) feedback after sending the response to the WTRU.

17. The network node of claim 15, wherein one or more of the RACH preambles or the payload are received via an uplink shared channel.

18. The network node of claim 15, further configured to send discontinuous reception (DRX) control information, the DRX control information indicating a time interval during which the WTRU is to monitor a downlink control channel.

19. The network node of claim 15, wherein the information is sent via a downlink control channel.

20. The network node of claim 15, wherein the payload comprises one or more of a scheduling request, a channel quality indicator, or a field indicating a next synchronization time.

* * * * *